US012658417B2

(12) United States Patent
Couzijn

(10) Patent No.: US 12,658,417 B2
(45) Date of Patent: Jun. 16, 2026

(54) METHOD OF CALIBRATING A MASS SPECTROMETER

(71) Applicant: Thermo Fisher Scientific (Bremen) GmbH, Bremen (DE)

(72) Inventor: Erik Couzijn, Bremen (DE)

(73) Assignee: Thermo Fisher Scientific (Bremen) GmbH, Bremen (DE)

( * ) Notice: Subject to any disclaimer, the term of this patent is extended or adjusted under 35 U.S.C. 154(b) by 370 days.

(21) Appl. No.: 18/573,395

(22) PCT Filed: Jun. 16, 2022

(86) PCT No.: PCT/EP2022/066511
§ 371 (c)(1),
(2) Date: Dec. 21, 2023

(87) PCT Pub. No.: WO2022/268650
PCT Pub. Date: Dec. 29, 2022

(65) Prior Publication Data

US 2024/0290596 A1 Aug. 29, 2024

(30) Foreign Application Priority Data

Jun. 22, 2021 (GB) ...................................... 2108949

(51) Int. Cl.
*H01J 49/02* (2006.01)
*H01J 49/00* (2006.01)
*H01J 49/06* (2006.01)

(52) U.S. Cl.
CPC ...... *H01J 49/0009* (2013.01); *H01J 49/0031* (2013.01); *H01J 49/005* (2013.01); *H01J 49/022* (2013.01); *H01J 49/06* (2013.01)

(58) Field of Classification Search
CPC ............... H01J 49/0009; H01J 49/0027; H01J 49/0031; H01J 49/005; H01J 49/022; H01J 49/06
See application file for complete search history.

(56) References Cited

U.S. PATENT DOCUMENTS 6,124,591 A 9/2000 Schwartz et al.
2009/0211109 A1 8/2009 Choi et al.
2011/0266426 A1 11/2011 Schwartz et al.

FOREIGN PATENT DOCUMENTS

WO 2008100941 A2 8/2008
WO 2020066009 A1 9/2018
WO WO-2021001246 A1 * 1/2021 .......... H01J 49/0045

OTHER PUBLICATIONS

Combined Search and Examination Report under Sections 17 & 18(3) for related Application No. GB 2108949.5, dated Jun. 22, 2023, 13 pages.

(Continued)

*Primary Examiner* — David E Smith

(57) ABSTRACT

A method of calibrating a mass spectrometer comprises generating calibration ions from an ion source that are transported from the ion source to a mass analyser of the mass spectrometer via an ion optics device. A characteristic voltage is applied to the ion optics device to control the transit of ions into or out of the ion optics device. The applied characteristic voltage results in an amount of unintentional dissociation of the calibration ions. An MS1 analysis of the calibration ions is performed using the mass analyser to obtain an MS1 spectrum. The amount of unintentional dissociation of the calibration ions in the MS1 spectrum is determined. The characteristic voltage is calibrated based on the amount of unintentional dissociation of the calibration ions to provide a target amount of unintentional dissociation during an MS1 analysis.

20 Claims, 7 Drawing Sheets

(56) References Cited

OTHER PUBLICATIONS

International Search Report and Written Opinion for related Application No. PCT/EP2022/066511, dated Oct. 10, 2022, 118pages.
Notification of Reasons for Rejection for related JP Application No. 2023-577135, 4 pages, mailed Dec. 19, 2024 (w/ partial English translation).

* cited by examiner

METHOD OF CALIBRATING A MASS SPECTROMETER

CROSS REFERENCE TO RELATED APPLICATIONS

This is the U.S. National Stage of International Application No. PCT/EP2022/066511, filed Jun. 16, 2022, which was published in English under PCT Article 21(2), which in turn claims the benefit of GB Application No. 2108949.5, filed Jun. 22, 2021, which is incorporated herein by reference in its entirety.

FIELD OF THE DISCLOSURE

The present disclosure relates to mass spectrometry. In particular, the present disclosure relates to an ion optics device for a mass spectrometer.

BACKGROUND

Mass spectrometry is a long-established technique for identification and quantitation of often complex mixtures of small and large organic molecules. In recent years, techniques have been developed that allow analysis of a wide range of both biological and non-biological materials, with application across the fields of law enforcement (e.g. identification of drugs and explosives materials), environmental, scientific research, and biology (e.g. in proteomics, the study of simple and complex mixtures of proteins, with applications in drug discovery, disease identification and so forth).

Proteins, comprising large numbers of amino acids, are typically of significant molecular weight. Proteins are often digested into a plurality of smaller peptides prior to mass analysis. The peptides in the protein digests are of lower molecular weight and thus are more straightforward to mass analyse. Some mass analysis techniques include mass analysis of the (unfragmented) analyte ions (MS1 analysis). Other mass analysis techniques involve the isolation and activation of the analyte ions of interest, followed by mass analysis of the resultant fragmented ions (MS2 analysis). Often identification and quantification techniques combine information from the MS1 and MS2 domains to infer information about the analyte ions.

When performing MS1 analysis, it is important that the analyte ions of interest do not fragment. Unintentional dissociation of the analyte ions could lead to errors in the resulting MS1 spectrum. For example, the MS1 spectrum may not include information about analyte ions which were completely dissociated. The MS1 spectrum may also include additional peaks resulting from the fragment ions which are not representative of analytes in the sample, potentially leading to false identifications. Also, quantitation may be hampered when part of the analyte ion population of interest is dissociated, or when the peak of the analyte ion of interest in the MS1 spectrum is overlapping with that of an isobaric fragment ion originating from a different analyte.

Unintentional dissociation of analyte ions is particularly a problem for molecules (e.g. certain amino acids, peptides, and lipids) which have one or more relatively weak chemical bonds. Such fragile analyte ions are prone to breakage at said weak chemical bonds upon collisional activation. Such collisional activation can occur undesirably during an MS1 analysis, for example when ions are cooled, or transported through a mass spectrometer (e.g. ions entering/being cooled in/exiting an ion trap). The degree to which analyte ions may unintentionally dissociate will depend on the chemistry of the analyte ion, the settings of the mass spectrometer, as well as variations in conditions and mechanical and electronic tolerances of the hardware. As such, the effects of unintentional dissociation on an MS1 analysis can be difficult to control.

SUMMARY

The degree to which ions unintentionally dissociate will depend on the mass spectrometer configuration, conditions and hardware tolerances, as well as on the chemistry of the ion. In particular, unintended dissociation of ions may occur in several regions inside a mass spectrometer where the vacuum is less high, or where the ion's magnitude and/or direction of motion differ significantly from those of the background gas molecules. As such, in some cases it can be challenging, if not impossible, to perform MS1 analysis without some degree of unintentional dissociation of ions. For a plurality of mass spectrometers operated at the same nominal settings, different degrees of unintentional dissociation will be observed due to differences in conditions and hardware tolerances that by themselves are not adjustable.

To reduce or eliminate the variation in unintentional dissociation, the method of the first aspect provides a way of calibrating a mass spectrometer to provide a target amount of unintentional dissociation. Such a calibration may be particularly beneficial where a plurality of mass spectrometers are to be calibrated to perform similar MS1 analyses.

Thus, according to a first aspect of the disclosure, a method of calibrating a mass spectrometer is provided. The method comprises:

- generating calibration ions from an ion source;
- transporting the calibration ions from the ion source to a mass analyser of the mass spectrometer via an ion optics device, wherein a characteristic voltage applied to the ion optics device controls the transit of ions into the ion optics device and/or out of the ion optics device, the characteristic voltage applied also resulting in an amount of unintentional dissociation of the calibration ions;
- performing an MS1 analysis of the calibration ions using the mass analyser to obtain an MS1 spectrum of the calibration ions; and
- determining the amount of unintentional dissociation of the calibration ions present in the MS1 spectrum,
- wherein the characteristic voltage of the ion optics device is calibrated based on the amount of unintentional dissociation of the calibration ions present in the MS1 spectrum to provide a target amount of unintentional dissociation of calibration ions during an MS1 analysis.

It will be appreciated that mass spectrometers include one or more ion optics devices for the purpose of transporting ions from an ion source to a mass analyser for mass analysis. In general, the ion optics devices are configured to apply various voltages (DC and/or RF biases) to confine and transport the ions from the ion source to the mass analyser. The magnitudes of these voltages are normally selected to efficiently transport a wide range of ions (e.g. a wide range of mass-to-charge ratios) from the ion source to the mass analyser. However, for some relatively fragile ions, such voltages may cause at least a portion of these ions to unintentionally dissociate during transit. Thus, for a population of relatively fragile ions, variations in one or more voltages of an ion optics device can affect the probability of a fragile ion unintentionally dissociating. As such, by controlling a characteristic voltage of an ion optics device, the amount of unintentional dissociation occurring during an MS1 analysis can be controlled.

By relatively fragile ions, it is meant that such ions are more likely to undergo unintentional dissociation than ions which are less fragile. From a chemical point of view, fragility means that the molecular ion contains one or more weak bonds that are prone to be broken upon collisional activation. Examples of relatively fragile ions include the amino acids isoleucine and phenylalanine, as well as the (oligo)peptides MRFA, ALELFR, and Substance P (RPKPQQFFGLM)—among others. The calibration ions may be amino acid ions or peptide ions, for example any of the aforementioned species, or lipid ions.

The method according to the first aspect applies this concept such that the amount of unintentional dissociation occurring in a mass spectrometer can be controlled by performing a calibration process. As such, a known calibration ion (typically a relatively fragile ion that is prone to unintentional dissociation) is mass analysed in the MS1 domain using the mass spectrometer. The amount of unintentional dissociation occurring during the MS1 analysis can be determined based on the MS1 spectrum of the calibration ion. The characteristic voltage of the ion optics device can then be adjusted based on the MS1 mass spectrum in order to provide a target amount of unintentional dissociation for the calibration ion. Thus, the performance of the mass spectrometer (with respect to unintentional dissociation of ions) may be standardised using the calibration process.

According to this disclosure, unintentional dissociation of ions is a reference to a process by which a parent or precursor ion, i.e. a molecular ion (typically an amino acid ion or a peptide ion) dissociates into two or more mass fragments (at least one of which being an ion) as part of the molecular ion's transit through the one or more ion optics device, where the intention is to mass analyse the unfragmented molecular ion. Such unintentional dissociation may occur when a molecular ion, travelling under the influence of e.g. an electrical field from an ion optics device, interacts with gas particles present in the ion optics device. It will be appreciated that such unintentional dissociation events are different to a process in which molecular ions are intentionally fragmented. For example, molecular ions may be intentionally fragmented in a fragmentation chamber, followed by performing mass analysis on the fragment ions (i.e. an MS2 analysis). According to this disclosure, in some embodiments, the unfragmented molecular ion typically is present in the mass analysis in a higher abundance than any of its fragment ions resulting from unintentional dissociation, for example at least 1.1×, 2×, 3×, 4×, 5×, 6×, 7×, 8×, 9×, or 10× higher abundance than any of its fragment ions. As another example, molecular ions may be intentionally fragmented where they are exposed to an accelerating potential intended to result in fragmentation of the molecular ion, rather than an accelerating potential intended for the purpose of transporting molecular ions using one or more ion optics devices. Typically, the accelerating potentials used for ion transport in some embodiments of this disclosure may have a magnitude of no greater than about 10 V, and may have a magnitude of less than 10 V. That is to say, the characteristic voltages to be calibrated according to this disclosure may provide an accelerating potential for ions in an ion optics device having a magnitude of no greater than about 10 V. The acceleration potential refers to the total acceleration potential to which the ions are subjected to accelerate them through the mass spectrometer.

According to this disclosure, the target amount of unintentional dissociation may be a predetermined value, a range of acceptable values, or a limit (i.e. the amount of unintentional dissociation may be no greater than a predetermined value). For example, in some embodiments, the target amount of unintentional dissociation may be about 0 (i.e. below the detection limit of the mass spectrometer).

According to this disclosure, the mass spectrometer is provided with an ion optics device. An ion optics device is a device which is used to transport ions from an ion source to a mass analyser. In some embodiments, the mass spectrometer may comprise a plurality of ion optics devices. Each ion optics device controls the ions through application of one or more voltages. Depending on the mass spectrometer, one or more of these voltages may have an effect on the amount of unintentional dissociation that occurs when the mass spectrometer is used to perform an MS1 analysis. Such a voltage is, according to this disclosure, considered to be a characteristic voltage of the ion optics device. For mass spectrometers comprising a plurality of ion optics devices, it will be appreciated that the method of the first aspect may be repeated in order to calibrate a plurality of characteristic voltages for the plurality of ion optics devices. Of course, it will be appreciated that while a mass spectrometer may have a plurality of voltages that may be calibrated according to the method of the first aspect, in practice some voltages of ion optics devices will have a more significant effect on unintentional dissociation than other voltages. As such, the characteristic voltages of ion optics devices according to this disclosure are preferably the voltage(s) of ion optics device(s) that have the most significant effect on unintentional dissociation of fragile ions, while little affecting the overall ion transmission and/or the m/z transmission window of these device(s). In general, such voltages are likely to be found in regions of the mass spectrometer where the pressure is relatively high. Ions in higher-pressure regions of the mass spectrometer are more likely to interact with other particles resulting in unintentional dissociation. It will also be appreciated that some voltages of the mass spectrometer may only have a limited range for calibration without adversely affecting the transmission of ions in the mass spectrometer. Such voltages may not be suitable for use as a characteristic voltage according to this disclosure, depending on the range of calibration that is desired.

In some embodiments, the amount of unintentional dissociation is determined based on an intensity of a mass spectral peak associated with a fragment ion of the calibration ions relative to an intensity of a mass spectral peak associated with the calibration ions. As such, the amount of unintentional dissociation may be determined based on a ratio of the amount of one or more fragment ions of the calibration ions to the amount of calibration ions detected in the MS1 spectrum.

In some embodiments, the target amount of unintentional dissociation is no greater than: 50%, 25%, 15%, 10%, 7%, 5%, 3%, 2%, 1%, or 0.5%. In some embodiments, the target amount of unintentional dissociation is in the range of 1% to 10%, or 2% to 8%, or 3% to 6%. While in some embodiments it may be preferable to provide a mass spectrometer which is calibrated such that no unintentional dissociation occurs, for some fragile ions this may be challenging or require significant operational compromises. In such cases, the mass spectrometer may be calibrated such that the amount of unintentional dissociation is controlled such that it is consistent and repeatable across a range of MS1 scans and/or a range of mass spectrometers.

In some embodiments, a plurality of MS1 analyses are performed at different characteristic voltages, wherein the amount of unintentional dissociation of the calibration ions is determined for each MS1 spectrum, and the characteristic voltage is calibrated based on the amount of unintentional dissociation of the calibration ions present in the MS1 spectra to provide a target amount of unintentional dissociation of calibration ions during an MS1 analysis. As such, the characteristic voltage may be calibrated based on determining a relationship between the characteristic voltage and the resulting amount of unintentional dissociation of calibration ions. For example, interpolation may be used to determine a suitable relationship based on the calibration measurements.

In some embodiments, the ion optics device is an ion trap or an ion guide. As such, the mass spectrometer may include an ion trap, wherein a characteristic voltage of the ion trap is controlled to control the amount of unintentional dissociation occurring during an MS1 analysis.

For example, in some embodiments transporting the calibration ions from the ion source to the mass analyser via the ion optics device comprises storing the calibration ions in the ion trap. Ions may be prone to unintentional dissociation when they enter, or are stored, in an ion trap. This is because the kinetic energy associated with the average motion of the ions entering the ion trap, relative to the average motion of background particles within the ion trap, can result in particle interactions which result in unintentional dissociation of at least some of the ions. To control this effect, the kinetic energy of the ions as they enter, or are stored in the ion trap may be controlled by the characteristic voltage of the ion trap.

In some embodiments, the characteristic voltage is at least one DC voltage applied to the ion optics device, in particular the ion trap, to provide a DC offset to the ion optics device/trap. The DC offset for the ion optics device/trap may be used to control the force which accelerates ions into the ion optics device/trap, or to control the force which prevents ions from exiting the ion optics device/trap, or to control the force with which ions exit the ion optics device/trap. In some embodiments, the characteristic voltage is at least one RF voltage applied to the optics device, in particular at least one RF voltage applied to the ion trap configured to confine ions in the ion trap. In some embodiments, the characteristic voltage is used to calibrate a plurality of voltages applied to the ion trap, the plurality of voltages configured to control one or more of: injecting calibration ions into the ion trap, confining calibration ions in the ion trap, and ejecting calibration ions from the ion trap. As such, by controlling one or more voltages applied to the ion trap, the amount of energy imparted to the ions by the ion trap may be controlled. This in turn may impact the degree of unintentional dissociation occurring within the ion trap.

In some embodiments, the characteristic voltage may comprise an RF voltage that is applied to an S-Lens, ion funnel, or a stacked ring ion guide.

In some embodiments, the method further comprises measuring a vacuum pressure associated with the mass spectrometer, wherein the characteristic voltage of the ion optics device is calibrated based on the amount of unintentional dissociation of the calibration ions present in the MS1 spectrum and the measured vacuum pressure. In some embodiments, the amount of unintentional dissociation occurring in the mass spectrometer may also depend on a pressure of the mass spectrometer, as the pressure of the mass spectrometer may affect the probability of ion-gas particle interactions occurring. Over time, the vacuum pressure within the mass spectrometer may vary. By taking into account any variations in pressure, the characteristic voltage of the ion optics device may further be adjusted to maintain a target amount of unintentional dissociation during an MS1 analysis of the calibration ions.

In some embodiments, transporting the calibration ions from the ion source to a mass analyser of the mass spectrometer via an ion optics device may comprise:

- transporting the calibration ions from the ion source to a mass selector, wherein the mass selector mass filters the calibration ions;
- transporting the calibration ions to the ion optics device; and
- transporting the calibration ions from the ion optics device to the mass analyser.

Accordingly, the mass spectrometer may mass filter the calibration ions prior to their entry into the ion optics device. By mass filtering the calibration ions, any unwanted ions may be removed, such that only the calibration ions are transported to the ion optics device. This in turn may allow the effect of the ion optics device (downstream of the mass selector) on the unintentional dissociation of the calibration ions to be identified more specifically. Additionally, this method may allow for calibration ions (i.e. a single species of ions) to be mass selected from a standard sample comprising a plurality of different ion species.

In some embodiments, the ion optics device may comprise a multipole assembly, preferably a quadrupole assembly. In some embodiments, the mass analyser may comprise an orbital trapping mass analyser, a time of flight mass analyser, a Fourier transform mass analyser, an ion trap mass analyser, a quadrupole mass analyser, or a magnetic sector mass analyser. As such, it will be appreciated that the method of the first aspect may be applied to any mass spectrometer. In particular, the method of the first aspect is not limited to any particular arrangement of ion optics devices and/or mass analysers.

In some embodiments, a plurality of mass spectrometers are calibrated to provide a target amount of unintentional dissociation of calibration ions during an MS1 analysis. As such, the method according to the first aspect may be applied to a plurality of mass spectrometers, such that each mass spectrometer provides a consistent target amount of unintentional dissociation during an MS1 analysis. Calibrating a plurality of mass spectrometers in such a manner may be particularly advantageous where MS1 analyses of samples including fragile ions are to be performed across a number of mass spectrometers.

According to a second aspect, a method of mass spectrometry for a mass spectrometer is provided. The method comprises:

- generating sample ions from an ion source;
- transporting the sample ions from the ion source to a mass analyser of the mass spectrometer via an ion optics device, wherein a characteristic voltage applied to the ion optics device controls the transit of ions into the ion optics device and/or out of the ion optics device;
- performing an MS1 analysis of the sample ions using the mass analyser to obtain an MS1 spectrum of the sample ions;
- wherein the characteristic voltage of the ion optics device is calibrated according to the method of the first aspect to provide an amount of unintentionally dissociated sample ions during the MS1 analysis.

As such, the method of the second aspect is performed using a mass spectrometer which has been calibrated according to the first aspect of the disclosure. Accordingly, MS1 scans performed according to the second aspect may have a consistent amount of unintentional dissociation, which may be particularly advantageous where MS1 analyses of relatively fragile ions are to be performed. While in some embodiments, the sample ions to be analysed may be the same ions, or same type of ions (e.g. peptides), as the calibration ions used to calibrate the mass spectrometer, in some embodiments the sample ions to be analysed may be different to the calibration ions used to calibrate the mass spectrometer. By calibrating the characteristic voltage of the ion optics device, any unintentional dissociation of the sample ions which originates from the calibrated ion optics device may be controlled via the characteristic voltage. Thus, by calibrating the mass spectrometer using the calibration ions, the amount of unintentional dissociation occurring when performing MS1 scans on sample ions may be controlled.

In some embodiments, the method further comprises determined the amount of unintentional dissociation based on an intensity of one or more mass spectral peaks associated with fragment ions (i.e. fragment ion species) of the sample ions relative to an intensity of one or more mass spectral peaks associated with the sample ions (i.e. unfragmented ions).

In some embodiments, the target amount of unintentional dissociation is no greater than 50%, 25%, 15%, 10%, 7%, 5%, 3%, 2%, 1%, or 0.5% of the sample ions transported to the mass analyser via the ion optics device. In some embodiments, the target amount of unintentional dissociation is in the range of 1% to 10%, or 2% to 8%, or 3% to 6% of the sample ions transported to the mass analyser via the ion optics device.

In some embodiments, the method further comprises measuring a vacuum pressure associated with the mass spectrometer. The characteristic voltage of the ion optics device is then updated based on the vacuum pressure of the mass spectrometer. By updating the characteristic voltage based on a vacuum pressure associated with the mass spectrometer, the method of mass spectrometry may account for changes in the operating condition the mass spectrometer which may in turn affect the amount of unintentional dissociation occurring in the mass spectrometer.

According to a third aspect of the disclosure, a mass spectrometer is provided. The mass spectrometer comprises an ion source, an ion optics device, a mass analyser, and a controller. The ion source is configured to generate calibration ions. The ion optics device is configured to receive calibration ions from the ion source. The mass analyser is configured to receive calibration ions from the ion optics device. The controller is configured to calibrate the mass spectrometer comprising:

- causing the ion source to generate calibration ions;
- causing the mass spectrometer to transport the calibration ions from the ion source to the mass analyser of the mass spectrometer via the ion optics device, wherein a characteristic voltage is applied to the ion optics device to control the transit of ions into the ion optics device and/or out of the ion optics device, wherein the characteristic voltage applied results in an amount of unintentional dissociation of the calibration ions;
- causing the mass analyser to perform an MS1 analysis of the calibration ions to obtain an MS1 spectrum of the calibration ions;
- determining the amount of unintentional dissociation of the calibration ions present in the MS1 spectrum; and
- calibrating the characteristic voltage of the ion optics device based on the amount of unintentional dissociation of the calibration ions present in the MS1 spectrum to provide a target amount of unintentional dissociation of calibration ions during an MS1 analysis.

Thus, the mass spectrometer of the third aspect is configured to perform the method of calibration according to the first aspect of the disclosure. It will be appreciated that the mass spectrometer of the third aspect may also be configured to perform the method of mass spectrometry according to the second aspect of the disclosure.

BRIEF DESCRIPTION OF THE FIGURES

Embodiments of the disclosure will now be described with reference to the following figures in which.

DETAILED DESCRIPTION

Figure 1:
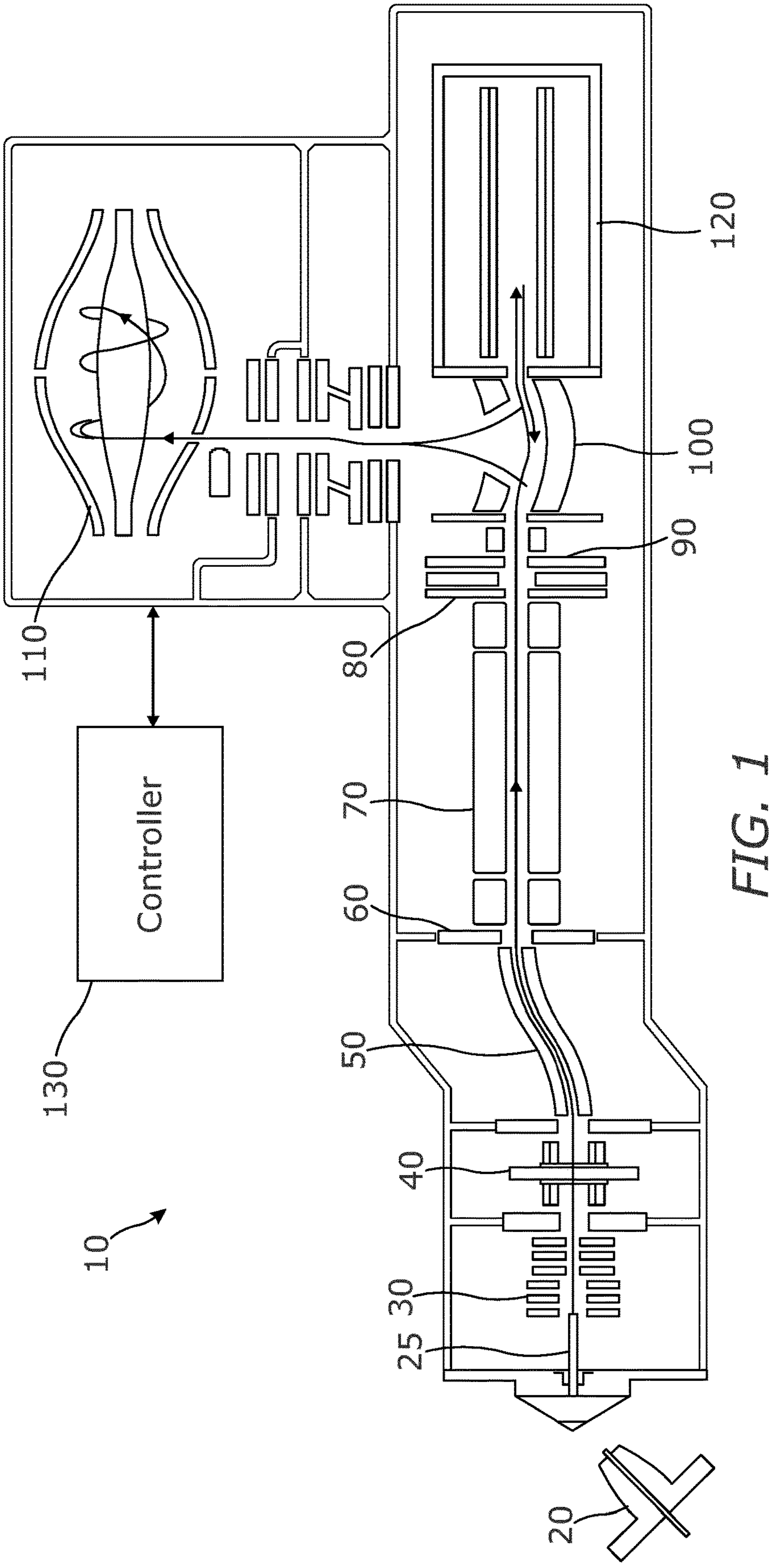
FIG. 1 shows a schematic diagram of a mass spectrometer according to an embodiment of the disclosure.
Figure 2:
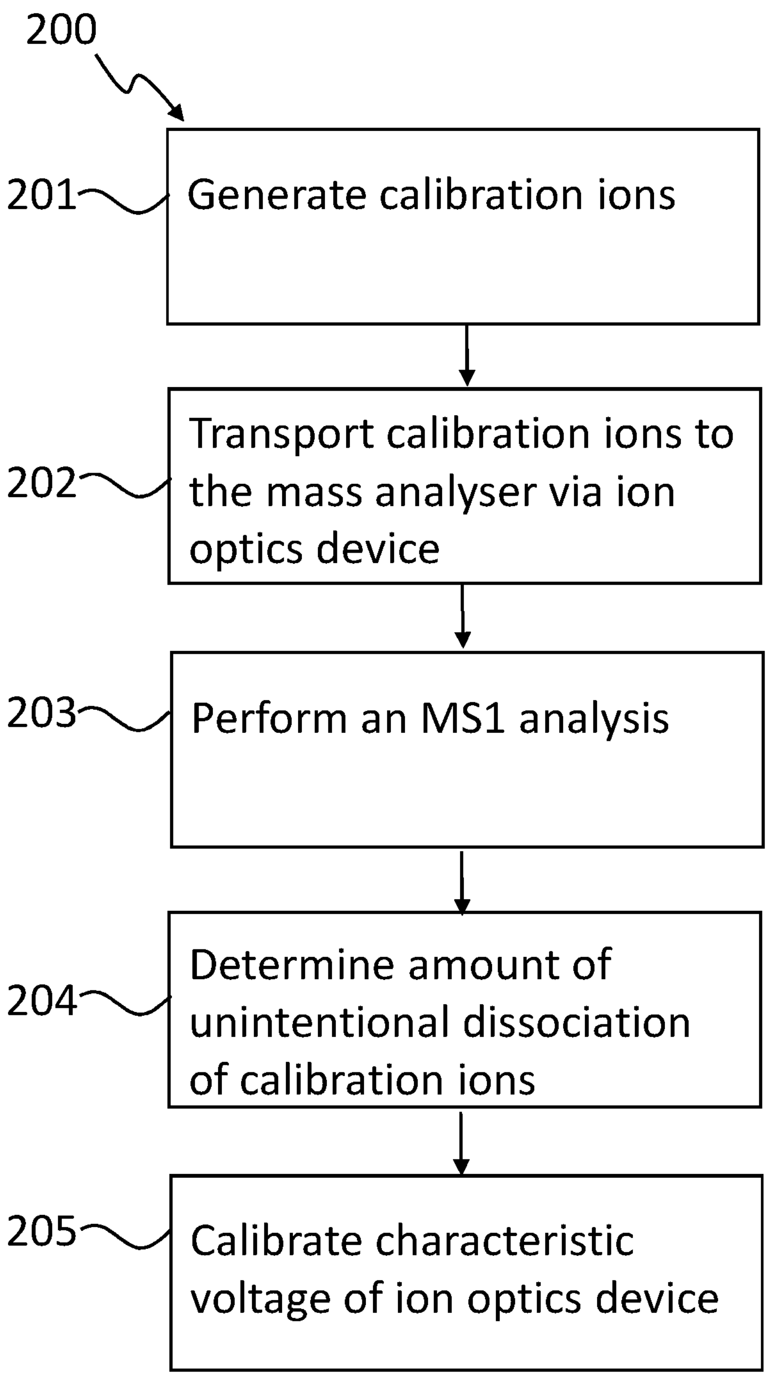
FIG. 2 is a flow chart of a method of calibrating a mass spectrometer according to an embodiment of the disclosure.

According to a first embodiment of the disclosure a mass spectrometer 10 is provided. A schematic diagram of the mass spectrometer is shown in FIG. 1. The arrangement of FIG. 1 represents, schematically, the configuration of the Orbitrap Exploris® 240 mass spectrometer from Thermo Fisher Scientific, Inc.

In FIG. 1, molecules to be analysed (e.g. sample molecules or calibration molecules) are supplied to the mass spectrometer 10. For some molecules, particularly calibration molecules, the molecules may be supplied to the mass spectrometer 10 by direct infusion. As such, the molecules to be analysed may be directly supplied to an ion source for ionisation.

As an alternative to direct infusion, molecules to be analysed (e.g. sample molecules or calibration molecules) may be supplied (for example from an autosampler) to the mass spectrometer 10 via a chromatographic apparatus such as a liquid chromatography (LC) column (not shown in FIG. 1). One such example of an LC column is the Thermo Fisher Scientific, Inc ProSwift® monolithic column which offers high performance liquid chromatography (HPLC) through the forcing of the sample carried in a mobile phase under high pressure through a stationary phase of irregularly or spherically shaped particles constituting the stationary phase. In the HPLC column, sample molecules elute at different rates according to their degree of interaction with the stationary phase.

The sample molecules (or calibration molecules) thus separated via liquid chromatography or supplied by direct infusion are then ionized using an ion source. In the embodiment of FIG. 1, the ion source is a (heated) electrospray ionization source ((H)ESI source) 20 which is at atmospheric pressure. Sample ions (or calibration ions) then enter a vacuum chamber of the mass spectrometer 10 and are directed to the mass analyser via a plurality of ion optics devices. In the embodiment of FIG. 1, sample ions (or calibration ions) are directed by a capillary 25 into an RF-only S-lens 30, which is a stacked-ring (RF) ion guide, at a low to medium vacuum pressure. The ions are focused by the S-lens 30 into an injection flatapole 40 which injects the ions into a bent flatapole 50 with an axial field. The bent flatapole 50 guides (charged) ions along a curved path through it whilst unwanted neutral molecules such as entrained solvent molecules are not guided along the curved path and are lost.

An ion gate (TK lens) 60 is located at the distal end of the bent flatapole 50 and controls the passage of the ions from the bent flatapole 50 into a downstream quadrupole mass filter 70. The quadrupole mass filter 70 is typically but not necessarily segmented and serves as a band pass filter, allowing passage of a selected mass number or limited mass range whilst excluding ions of other mass to charge ratios (m/z). The quadrupole mass filter 70 can also be operated in a wide-band transmission mode. The quadrupole mass filter 70 is located in a high-vacuum region of the spectrometer, e.g. with a pressure of $1\times10^{-4}$ mbar or less, or $5\times10^{-5}$ mbar or less.

Ions then pass through a quadrupole exit lens/split lens arrangement 80 and into a transfer multipole 90. The transfer multipole 90 guides the mass-filtered ions from the quadrupole mass filter 70 into a curved linear ion trap (C-trap) 100. The C-trap 100 is also located in a high-vacuum region of the spectrometer similar to the quadrupole mass filter 70. Typically, a cavity of the C-trap 100 in which ions are confined is at a pressure of about $5\times10^{-3}$ mbar or less due to a supply of nitrogen gas coming from the adjacent ion routing multipole 120 (which is at a higher pressure). The C-trap 100 has longitudinally extending, curved electrodes which are supplied with RF voltages and end caps to which DC voltages are supplied. The result is a potential well that extends along the curved longitudinal axis of the C-trap 100. In a first mode of operation, the DC end cap voltages are set on the C-trap so that ions arriving from the transfer multipole 90 are accumulated in the potential well of the C-trap 100, where they are cooled. Cooled ions reside in a cloud towards the bottom of the potential well and are then ejected orthogonally from the C-trap 100 towards the mass analyser 110.

The number of the ions accumulated in the C-trap 100 (i.e. the ion population) determines the number of ions that is subsequently ejected from the C-trap 100 into the mass analyser 110. The C-trap 100 may eject ions as a packet of ions into the mass analyser 110. The C-trap 100 may also eject ions axially into the ion routing multipole 120 which is arranged on an opposing end of the C-trap 100 to the quadrupole mass filter 70. In another mode, the DC end cap voltages of the C-trap 100 can be set so that a potential well is not formed for ions arriving from the transfer multipole 90, which are instead transmitted through the C-trap 100 without being accumulated there and into the ion routing multipole 120.

Accordingly, ions in the mass spectrometer 10 may travel from the bent flatapole 50 through the ion gate 60, quadrupole mass filter 70, lens 80, transfer multipole 90, and C-trap 100 into the ion routing multipole. Along this ion trajectory, ions within the mass spectrometer 10 may be subject to an accelerating potential for the purpose of transporting the ions from the bent flatapole 50 to the ion routing multipole. It will be appreciated that the accelerating potentials applied to these ion optics devices are significantly lower than the accelerating potentials that may be applied in order to intentionally fragment ions in e.g. a fragmentation chamber. For example, in some embodiments, the accelerating potential applied between the bent flatapole 50 and the ion routing multipole may be no greater than about 10 V.

The ion routing multipole in use is filled with a collision gas (e.g. helium or nitrogen) and as such has a higher pressure than the C-trap 100. The ion routing multipole is, in normal operation filled with a collision gas at a pressure of at least $3\times10^{-3}$ mbar to about $2\times10^{-2}$ mbar. A typical operating pressure for the ion routing multipole is about $1.1\times10^{-2}$ mbar. As the ion routing multipole 120 is at a relatively higher pressure than other ion optics components of the mass spectrometer 10 (e.g. C-trap 100), the kinetic energy of the ions entering the ion routing multipole 120 may be sufficient to result in unintentional dissociation of part of the ions, if these ions are fragile. As such, the ion routing multiple 120, specifically the transit of ions into the ion routing multipole, represents one part of the mass spectrometer where unintentional dissociation may occur. As such, control, and calibration of the accelerating potential experienced by the ions on entry to the ion routing multipole provides a mechanism by which one or more characteristic voltages can be used to control the amount of unintentional dissociation occurring within the ion optics devices of the mass spectrometer 10.

The ion routing multipole 120 may, in some embodiments, be configured to store ions for mass analysis in the mass analyser 110. As such, the ion routing multipole 120 is a form of ion trap which acts as an ion optics device along the ion path between the ESI source 20 and the mass analyser 110. Ions may be stored and/or cooled in the ion routing multipole 120 for the purpose of performing MS1 analyses or MS2 analyses.

The ion routing multipole 120 typically comprises a set of multipole rods which extend along the ion routing multipole 120, arranged about a central axis of the ion routing multipole. The multipole rods may be e.g. a quadrupole, a hexapole, or an octapole. The ion routing multipole 120 may also include a pair of end electrodes arranged at opposing ends of the set of multipole rods. RF potentials are applied to the set of multipole rods in order to form a pseudopotential field to confine ions along the central axis of the ion routing multipole 120. A DC potential may also be applied to the multipole rods such that the RF potentials are superimposed on the DC potential. In some embodiments, the ion routing multipole may include additional axial DC electrodes along the length of the ion routing multipole. The axial DC electrodes are configured to provide a plurality of DC voltages along the length of the multipole rods. The axial DC electrodes can be configured to provide an axially increasing, axially flat, or axially decreasing DC voltage profile along the length of the ion routing multipole. As such, the ion routing multipole includes a plurality of different voltages which may be controlled by the controller 130 in order to control how ion are injected into, cooled within, and ejected from, the ion routing multipole. For example, the DC potential of the axial DC electrodes and/or the DC potential of the multipole rods may determine the accelerating potential experienced by the ions as they travel from the bent flatapole 50 and enter the ion routing multipole 120. The amount of acceleration experienced by the ions will affect the kinetic energy of the ions on entry to the ion routing multipole.

Ions may be stored in the ion routing multipole 120 through the application of a DC voltage that is applied to the axial ends of the ion routing multipole 120 (known as a trapping voltage), and also to the set of multipole rods. Application of the trapping voltage prevents ions from escaping from the ion routing multipole 120 to the C-trap when not desired. As such, the trapping potential controls the entry of ions into the ion routing multipole, as well as when ions are ejected from the ion trap. For MS1 analyses, ions stored in the ion routing multipole 120 are ejected (intentionally) back into the C-trap 100, wherein the ions are then ejected to the mass analyser 110.

The controller 130 may calibrate one or more of the above described voltages of the ion routing multipole 120 in accordance with the method of calibrating a characteristic voltage of an ion optics device. In some embodiments, the characteristic voltage may be one of the above voltages mentioned above (e.g. the DC voltage applied to the axial ends of the ion routing multipole, the DC voltages applied to the multipole rods, or the DC or RF voltages applied to the multipole rods). In some embodiments, the various voltages of the ion routing multipole 120 (or indeed any other ion optics device having a plurality of voltages) may be related to each other by one or more relationships. As such, the characteristic voltage to be determined may be used to calibrate a plurality of voltages of an ion optics device. For example, in some embodiments, the DC voltage applied to the entrance electrode of the ion routing multipole may be about 30% of the DC potential applied to the multipole rods. Accordingly, a characteristic voltage (e.g. the DC voltage of the multiple rods) may be used to calibrate a plurality of voltages of an ion optics device on the basis of one or more voltage relationships.

As shown in FIG. 1, the mass analyser 110 is an orbital trapping mass analyser 110 such as the Orbitrap® mass analyser sold by Thermo Fisher Scientific, Inc. The orbital trapping mass analyser 110 has an off-centre injection aperture and the ions are injected into the orbital trapping device 110 as coherent packets, through the off-centre injection aperture. Ions are then trapped within the orbital trapping mass analyser 110 by a hyperlogarithmic electric field, and undergo back-and-forth motion in a longitudinal (z) direction whilst orbiting around the inner electrode.

The axial (z) component of the movement of the ion packets in the orbital trapping mass analyser 110 is (more or less) defined as simple harmonic motion, with the angular frequency in the z direction being related to the square root of the mass-to-charge ratio of a given ion species. Thus, over time, ions separate in accordance with their mass-to-charge ratio (m/z).

Ions in the orbital trapping mass analyser 110 are detected by use of an image current detector (not shown in FIG. 1) which produces a "transient" in the time domain containing information on all of the ion species as they pass the image detector. The transient is then subjected to a Fast Fourier Transform (FFT) resulting in a series of peaks in the frequency domain. From these peaks, a mass spectrum, representing abundance/ion intensity versus m/z, can be produced.

In the configuration described above, the sample ions (more specifically, a subset of the sample ions within a mass range of interest, selected by the quadrupole mass filter) are analysed by the orbital trapping mass analyser 110 without intentional fragmentation. The resulting mass spectrum is denoted MS1.

MS/MS (or, more generally, $MS^n$) can also be carried out by the mass spectrometer 10 of FIG. 1. To achieve this, precursor sample ions are generated and transported to the quadrupole mass filter 70 where a subsidiary mass range is selected. The ions that leave the quadrupole mass filter 70 are injected through the C-trap 100 into the ion routing multipole 120. The ion routing multipole 120 may also be configured to act as a fragmentation chamber that is configured to fragment precursor ions into fragment ions. For example, in the mass spectrometer 10 of FIG. 1, the ion routing multipole may comprise a higher energy collisional dissociation (HCD) device to which a collision gas is supplied. Precursor ions arriving into the ion routing multipole 120 may collide at high energy with gas molecules resulting in fragmentation of the precursor sample ions into fragment ions. The fragment ions are then ejected from the ion routing multipole 120 back into the C-trap 100, where they are once again trapped and cooled in the potential well. Finally, the fragment ions trapped in the C-trap are ejected orthogonally towards the orbital trapping device 110 for analysis and detection. The resulting mass spectrum of the fragment ions is denoted MS2.

Although an ion routing multiple 120 comprising an HCD device is shown in FIG. 1, other fragmentation devices may be employed for MS2 analyses instead, employing such methods as collision induced dissociation (CID), electron capture dissociation (ECD), electron transfer dissociation (ETD), photodissociation, and so forth.

The "dead end" configuration of the ion routing multipole 120 in FIG. 1, wherein precursor ions are ejected axially from the C-trap 100 in a first direction towards the ion routing multipole 120, and the resulting fragment ions are returned back to the C-trap 100 in the opposite direction, is described in further detail in WO-A-2006/103412.

The mass spectrometer 10 is under the control of a controller 130 which, for example, is configured to control the timing of ejection and trapping voltages, to set the appropriate potentials on the electrodes of the S-lens, quadrupole etc. so as to focus and filter the ions, to capture the mass spectral data from the orbital trapping device 110, control the sequence of MS1 and MS2 scans and so forth. It will be appreciated that the controller 130 may comprise a computer that may be operated according to a computer program comprising instructions to cause the mass spectrometer to execute the steps of the method according to the present invention.

It is to be understood that the specific arrangement of components shown in FIG. 1 is not essential to the methods subsequently described. Indeed, the methods described in this disclosure may be implemented on any controller for controlling the injection of ions into a Fourier Transform mass analyser, a TOF mass analyser, or an ion trap mass analyser.

Further, the skilled person will appreciate that the mass spectrometer 10 of FIG. 1 is one example of an apparatus in which ions are transported from an ion source (ESI source 20) to a mass analyser (110) via one or more ion optics devices. As such, in the embodiment of FIG. 1 the capillary 25, the S-lens 30, the injection filter 40, the bent flatapole 50, the ion gate 60, the quadrupole mass filter 70, the exit lens/split lens arrangement 80, the transfer multipole 90, the C-trap 100, and the ion routing multipole 120 are examples of ion optics devices. The ion optics devices are each configured to transport sample ions (or calibration ions) from the ESI ion source 20 to the mass analyser 110. In other embodiments, other configurations of ion optics device(s) may be used to transport ions from an ion source to a mass analyser.

Figure 3:
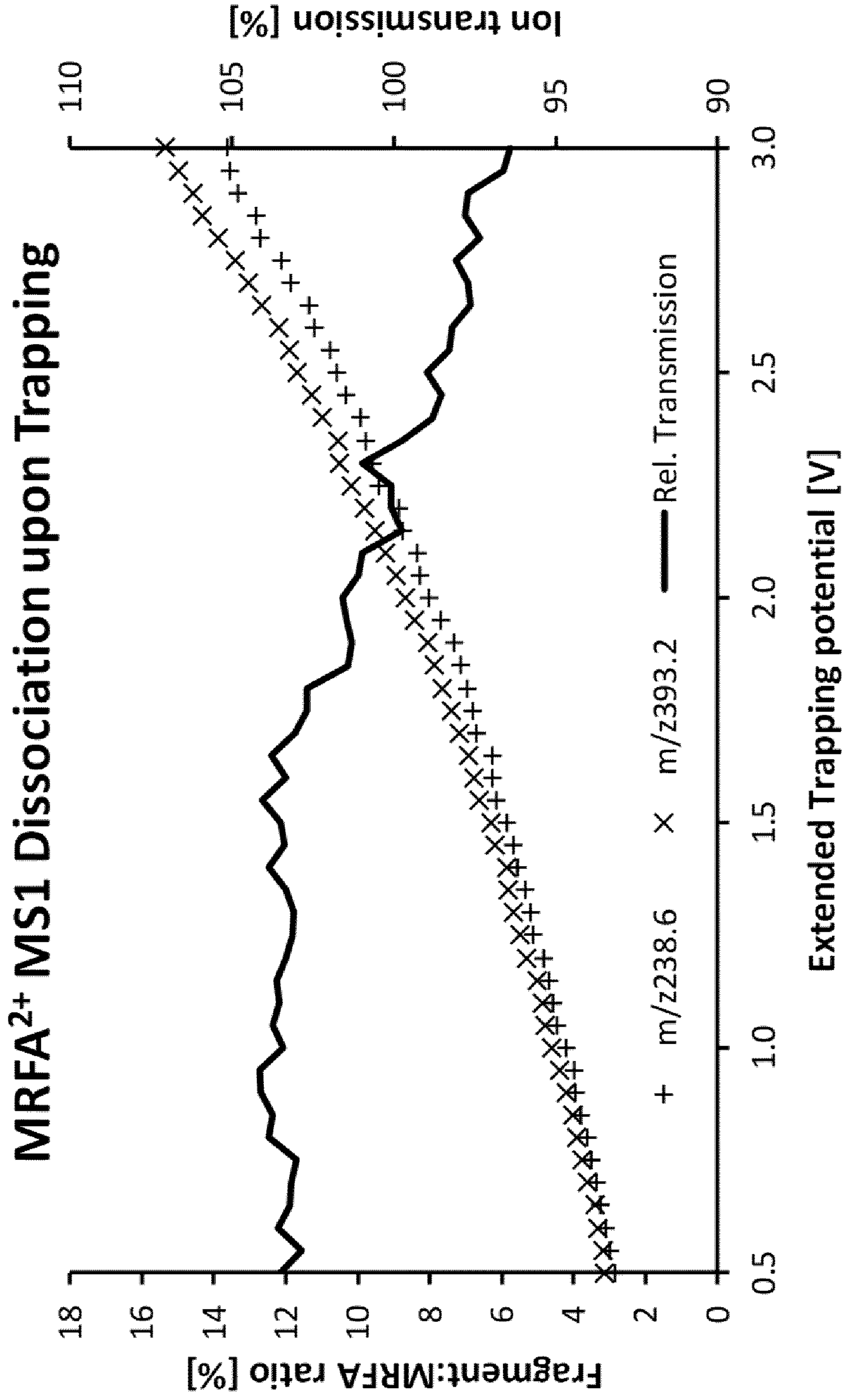
FIG. 3 is a graph showing the effect of varying a characteristic voltage on the unintended dissociation of $MRFA^{2+}$ ions.

According to an embodiment of the invention, a method 200 of calibrating the mass spectrometer 10 is provided. A flow chart of the method 200 is shown in FIG. 3. For example, the controller 130 may be configured to cause the mass spectrometer 10 to perform the calibration method 200 using the mass spectrometer 10 of FIG. 1.

As shown in step 201, the mass spectrometer 10 generates calibration ions. The calibration ions are generated using the ESI source 20. The sample used to generate the calibration ions may be, for example, a calibration solution comprising molecules which are known to form suitably fragile ions. One example of a suitable calibration solution is the Pierce® FlexMix® Calibration Solution from Thermo Scientific®. This calibration solution, when ionised, will form ions including the peptide ions $[MRFA+H_2O]^{2+}$ ($MRFA^{2+}$, having a mass-to-charge ratio (m/z) of 262.636 Th). This ion is known to be a fragile ion under normal operating conditions. In particular, at least some $[MRFA+H_2O]^{2+}$ calibration ions may unintentionally dissociate into primarily the fragment ions $[MRFA-MeSH]^{2+}$ (m/z 238.634 Th) and $[RFA+H_2O]^{+}$ (m/z 393.224) during transport by one or more ion optics devices.

In step 202 the mass spectrometer 10 transports the calibration ions to the mass analyser 110 via the capillary 25, S-lens 30, injection filter 40, bent flatapole 50, ion gate 60, quadrupole mass filter 70, exit lens/split lens arrangement 80, transfer multipole 90, C-trap 100, and ion routing multipole 120. The accelerating potential applied to the ions between the bent flatapole 50 and the ion routing multipole influences the kinetic energy of the calibrations ions as they enter and are cooled within the ion routing multipole. The kinetic energy of the calibration ions influences the amount of unintentional dissociation that occurs as the calibration ions transit to the mass analyser.

As part of the ion transport process, the calibration ions may be mass filtered by the quadrupole mass filter with a narrow mass window centred on an m/z of 262.636 (i.e. mass selecting calibration ions with a mass-to-charge ratio similar to that of $MRFA^{2+}$). A suitable narrow mass window may be a mass window of about 2-10 m/z. Following mass selection, the mass-selected calibration ions are then stored briefly in the ion routing multipole 120 prior to mass analysis. In order to store the calibration ions in the ion routing multipole, a trapping voltage is applied to ion routing multipole 120 (relative to a voltage at which the C-trap 100 may be held). For example, under normal operation in MS1 mode, the trapping voltage applied to the ion routing multipole for storing non-fragile (positively charged) ions may be −2.0 V relative to the C-trap 100.

In step 203 the mass analyser 110 mass analyses the calibration ions and outputs a mass spectrum of the calibration ions.

The controller 130 may then determine an amount of unintentional dissociation in step 204 based on the mass spectral peaks present in the MS1 mass spectrum. It will be appreciated that the methods and systems of this disclosure may be applied to a wide range of calibration ions being used and various types of mass spectrometer. In view of this, there are a number of different methods by which the amount of unintentional dissociation occurring in the MS1 spectrum may be determined.

This disclosure refers to the intensity of the mass spectral peaks of the MS1 spectra. It will be appreciated that when analysing the MS1 spectra, in some embodiments the intensity of the mass spectral peaks may be represented by the absolute values for intensity provided in the MS1 spectra. In some embodiments, the intensity of the mass spectral peaks of the mass spectra may also be a signal-to-noise ratio for each of the mass spectral peaks.

One such method is to determine a percentage of unintentional dissociation based on a ratio of the intensity of a mass spectral peak associated with a fragment ion of the calibration ion ($M_{fragment}$) to an intensity of a mass spectral peak associated with the calibration ion ($M_{calib}$) (i.e. a relative amount of unintentional fragment) or to the sum of intensities of the mass spectral peaks associated with the fragment ion and the calibration ion ($M_{fragment}+M_{calib}$) (i.e. the extent of unintentional fragmentation occurring). For example in some embodiments, the relative amount of unintentional dissociation ($C_{frag}$) may be calculated based on $M_{calib}$ and $M_{fragment}$ according to:

$$C_{frag} = M_{fragment}/M_{calib}$$

In some embodiments, in the foregoing ratio, the intensity of a mass spectral peak associated with a fragment ion of the calibration ion ($M_{fragment}$) may be replaced by summed intensities of mass spectral peaks associated with a plurality of different fragment ions of the calibration ion.

In some embodiments, the amount of unintentional dissociation may be determined based on a ratio of an intensity of a mass spectral peak associated with a first calibration ion ($M_{oalib1}$) and an intensity of a mass spectral peak associated with a second calibration ion ($M_{calib2}$). For example:

$$C_{analyte\_ratio} = M_{calib1}/M_{calib2}$$

This method may be suitable where the sample used for calibrating the mass spectrometer comprises two different calibration molecules having a known concentration ratio. In particular, it is preferable if one of the calibration molecules forms a relatively fragile ion, i.e. one of the calibration ions is more fragile than the other.

As such, there are various methods according to this disclosure by which the amount of unintentional dissociation occurring may be characterised. It will also be appreciated that the above examples can each be mathematically expressed in a different way whilst still providing a value for the amount of unintentional dissociation. Once the amount of unintentional dissociation occurring is determined, the mass spectrometer in step 205 proceeds to calibrate the characteristic voltage of one or more ion optics devices. In order to determine if the characteristic voltage is to be adjusted, the controller 130 may compare the amount of unintentional dissociation occurring (e.g. $C_{frag}$, $C_{analyte\_ratio}$) to a target amount of unintentional dissociation (T). The calibration of the characteristic voltage is discussed in further detail below.

FIG. 3 is a graph which shows how the amount of unintentional dissociation in an MS1 scan varies with variation in a characteristic voltage applied to the ion routing multipole 120. In the graph of FIG. 3, a series of MS1 scans were performed with different trapping voltages, wherein $[MRFA+H_2O]^{2+}$ ($MRFA^{2+}$, m/z 262.636 Th) calibration ions were trapped in the ion routing multipole 120 prior to MS1 analysis in the mass analyser 110.

The left-hand side of FIG. 3 shows plots of the ratio of the intensity of known fragment ion spectral peaks relative to the intensity of the $[MRFA]^{2+}$ mass spectral peak, expressed as a percentage. FIG. 3 shows plots for the fragment ion $[MRFA-MeSH]^{2+}$ (m/z 238.634 Th) and the fragment ion $[RFA+H_2O]^{+}$ (m/z 393.224). As mentioned previously, a normal MS1 trapping potential used for the ion routing multipole 120 is about 2.0 V (negative for positive ions and vice versa) relative to the voltage of the C-trap 100. By reducing the trapping potential, the amount of unintentional dissociation occurring is reduced. By increasing the trapping potential, the amount of unintentional dissociation is increased. Thus, the controller 130 may adjust the trapping potential applied to the ion routing multipole 120 in order to control the amount of unintentional dissociation occurring. It will be appreciated that for the mass spectrometer 10 of FIG. 1, the magnitude of the trapping potential may be varied between about 0.5 V and 3.0 V. In the example of FIG. 3, the variation in trapping potential provides for a variation in unintentional dissociation between about 3% and 13% for the $[MRFA–MeSH]^{2+}$ (m/z 238.634 Th) fragment ion and between about 3% and 15% for the $[RFA+H_2O]^{+}$ (m/z 393.224) fragment ion.

The right-hand axis of FIG. 3 shows the total ion transmission percentage of the $[MRFA]^{2+}$ calibration ion plus its unintended MS1 fragments for different trapping potential magnitudes. The total ion transmission percentage is expressed as a percentage relative to the total transmission at a trapping potential magnitude of 2.0 V. FIG. 3 shows that between a trapping voltage magnitude of 0.5 V and 3.0 V, the relative transmission varies between about 104% and 96% of the total transmission at a "normal" trapping potential magnitude of 2.0 V.

In some embodiments, the mass spectrometer 10 may be calibrated by performing a plurality of measurements of unintentional dissociation at different characteristic voltages. Performing a plurality of measurements, for example as shown in FIG. 3 may allow for a relationship between the characteristic voltage and the amount of unintentional dissociation to be determined. For example, the controller 130 may interpolate the data points to determine a relationship between the amount of unintentional dissociation and the characteristic voltage. Suitable interpolation methods include, for example, polynomial interpolation. The characteristic voltage may then be calibrated based on a target amount of unintentional dissociation using the determined relationship.

In some embodiments, the mass spectrometer 10 may be calibrated such that the amount of unintentional dissociation should be equal to a target amount of unintentional dissociation, T (e.g. $C_{frag}$=T). For example, in some embodiments, the target amount of unintentional dissociation may be about 2%, 4%, 6%, 8% or 10%.

In some embodiments, the mass spectrometer may be calibrated such that the amount of unintentional dissociation is no greater than a target amount of unintentional dissociation ($C_{frag} \leq T$). For example, the amount of unintentional dissociation may be no greater than: 10%, 8%, 6%, 4% or 2%.

In some embodiments, the mass spectrometer may be calibrated such that the amount of unintentional dissociation falls within a range of target amounts ($T_1$, $T_2$) of unintentional dissociation ($T_1 \leq C_{frag} \leq T_2$). It will be appreciated that similar limits may be applied to any of the methods for characterising the amount of unintentional dissociation ($C_{frag}$, $C_{analyte\_ratio}$) described herein, or indeed any other suitable methods for characterising the amount of unintentional dissociation occurring. For example, the target range may be about 1% to 10%, or 2% to 8%, or 3% to 6%.

In some embodiments, the controller 130 may calibrate the characteristic voltage (e.g. the trapping potential) using an iterative process. In an iterative process, the mass spectrometer 10 may perform repeat MS1 analyses and characteristic voltage calibrations until the mass spectrometer meets the desired criteria (the target amount of unintentional dissociation) for the amount of unintentional dissociation of calibration ions occurring.

It will be appreciated that the process for arriving at the calibrated voltage will depend on the criteria for the target amount of unintentional dissociation. For example, in some embodiments, a general relationship between the characteristic voltage and the amount of unintentional dissociation may be known in advance by the controller. In other embodiments, the controller 130 may calibrate the characteristic voltage using a predetermined relationship between the characteristic voltage and a resulting change in the amount of unintentional dissociation.

While in some embodiments, the controller may calibrate a characteristic voltage of an ion optics device (e.g. ion routing multipole 120), it will be appreciated that the calibration method may be repeated for a plurality of voltages of ion optics devices of the mass spectrometer. For example, where an ion optics device includes a plurality of voltages, each of the voltages may be calibrated in turn. In some embodiments, the calibration method may be applied to each of a plurality of ion optics devices in turn. Sequential calibration of a plurality of ion optics device may be particularly advantageous where it is desired to minimise or to reduce unintentional dissociation to relatively low levels.

Thus, in accordance with the method 200 described above, a mass spectrometer 10 may be calibrated to provide a target amount of unintentional dissociation. The method 200 according to this disclosure may be particularly of interest when applied to a plurality of mass spectrometers 10. Where a plurality of mass spectrometers 10 are used to perform similar MS1 analyses, small differences in the set-up of each mass spectrometer may result in variation in the performance of each mass spectrometer 10. In particular, the degree of unintended dissociation of ions when performing MS1 analysis can vary with each mass spectrometer depending on hardware tolerances (mechanical and electronic). In order to achieve very similar performance across spectrometers, the method 200 can be applied. According to the method of calibrating a mass spectrometer 200, a plurality of mass spectrometers 10 may be calibrated to control for possible variations in the amount of unintentional dissociation between mass spectrometers 10.

Where a plurality of mass spectrometers 10 are calibrated according to an embodiment of this disclosure, the plurality of mass spectrometers 10 may be calibrated such that an amount of unintentional dissociation of a calibration ion across the plurality of mass spectrometers has a relative standard deviation of no greater than 10% or 5%. As such, the mass spectrometers 10 may perform MS1 measurements with reduced variation in the amount of unintentional dissociation of a calibration ion. In some embodiments, the mass spectrometers 10 may also be calibrated on the basis of a calibration ion such that the amount of unintentional dissociation of a different sample ion is controlled. That is to say, in some embodiments, the mass spectrometers 10 may be calibrated using a calibration ion such that the relative standard deviation of the amount of unintentional dissociation of a sample ion (different to the calibration ion) has a relative standard deviation within a specified range. For example, the relative standard deviation of the amount of unintentional dissociation of the sample ion may be no greater than 20%, 15%, 10% or 5%.

Figure 4:
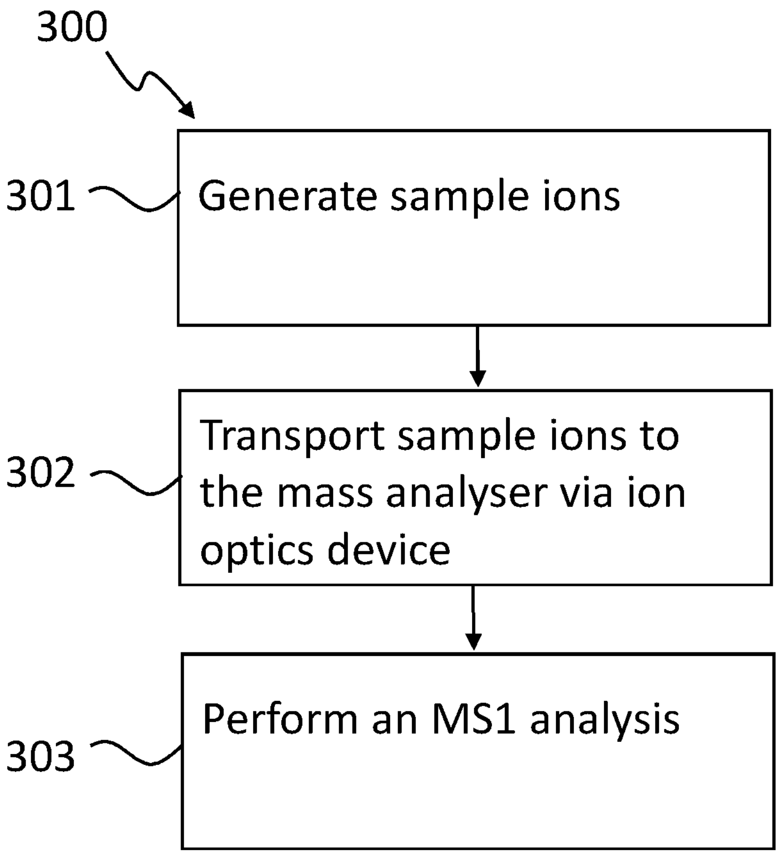
FIG. 4 is a flow chart of a method of mass spectrometry according to an embodiment of the disclosure.

FIG. 4 shows a flow chart of a method of mass spectrometry 300 according to an embodiment of the disclosure. The method 300 may be performed by a mass spectrometer 10 as shown in FIG. 1 that has been calibrated in accordance with the calibration method 200 described above.

According to step 301 of the method 300, sample ions are generated by the ESI source 20. The sample ions may comprise any ions suitable for MS1 analysis. As such, the sample ions to be analysed may be different (e.g. having a different mass-to-charge ratio) to the calibration ions.

In step 302, the sample ions are transported to the mass analyser 110 via the ion optics devices. When transporting the sample ions the ion optics devices utilise the calibrated characteristic voltages that were set by the calibration method 200. As such, the effect of the voltages applied to the ion optics devices may be controlled in order to control any unintentional dissociation occurring during ion transport. For example, in accordance with the calibration method 200 described above, the trapping voltage applied to the ion routing multipole 120 may be the calibrated voltage such that the amount of unintentional dissociation that occurs when sample ions are cooled in the ion routing multipole 120 may be controlled.

In step 303, the mass analyser 110 performs an MS1 analysis and outputs the resulting mass spectrum to the controller 130 for analysis.

In some embodiments, the sample to be analysed may comprise a known fragile ion, or the sample may comprise an internal standard comprising a known calibration ion. Thus, the resulting MS1 mass spectrum produced in step 303 of the method 300 may include information about the amount of unintentional dissociation occurring in the mass spectrometer that can be used to update the calibration of the mass spectrometer 10. For example, the MS1 spectrum may comprise mass spectral peaks representative of a known fragile ion and a mass spectral peak of a known mass fragment (fragment ion) of the fragile ion. Thus, in some embodiments, the mass spectrometer may effectively perform the method 200 of calibrating the characteristic voltage of the mass spectrometer 10 in real-time based on the data in the MS1 spectrum obtained in step 303.

Where the mass spectrometer 10 is configured to update the characteristic voltage in real time, the mass spectrometer may average data over several MS1 scans to determine whether the characteristic voltage is to be updated. In some embodiments, the mass spectrometer may filter the data from one or more MS1 scans, regarding whether the amount of unintentional dissociation occurring is varying sufficiently that the characteristic voltage should be updated. For example, if the change in the amount of unintentional dissociation is within a specified range of a target value, or range of target values, the mass spectrometer may elect not to update the characteristic voltage. By averaging, or filtering the data regarding unintentional dissociation, jitter associated with repeated updates to the characteristic voltage may be reduced or eliminated.

Thus, a method of mass spectrometry 300 may be provided in accordance with an embodiment of the disclosure.

While the above embodiments discuss the calibration method in terms of a characteristic voltage being a trapping potential applied to the ion routing multipole 120, it will be appreciated that in other embodiments, a different voltage of the mass spectrometer may be calibrated (i.e. a different voltage may be the characteristic voltage to be calibrated).

In some embodiments, the characteristic voltage may be an RF voltage applied to an ion trap (or similar ion confining device utilising RF voltages). Alternatively, the RF voltage provided to the S-lens 30 may be calibrated. The voltage, or voltages, to be calibrated will depend on the arrangement of the mass spectrometer to be calibrated.

According to the above described embodiments of the disclosure, the characteristic voltage of the ion optics device may be calibrated based on the amount of unintentional dissociation of calibration ions determined in the MS1 mass spectrum. In addition to the information in the MS1 spectrum, in some embodiments the mass spectrometer may also take into account further information regarding the operating state of the mass spectrometer when performing the calibration.

In some embodiments, the amount of unintentional dissociation occurring for a given ion optics characteristic voltage may also depend on a pressure of the mass spectrometer. Variations in the pressure of the mass spectrometer, for example a pressure of the mass spectrometer in the region of one or more ion optics devices, may influence the amount of unintentional dissociation occurring. For example, a reduction in a pressure of the mass spectrometer may result in a reduction of the efficiency of ion cooling within the mass spectrometer, leading to ions having a higher kinetic energy when transiting through the ion optics devices. Where ions have higher kinetic energy, unintentional dissociation may be more likely to occur.

In some embodiments, it is desirable to provide a mass spectrometer having a relatively consistent amount of unintentional dissociation. Thus, the characteristic voltage may be further calibrated and controlled in order to account for any variations in pressure and the resulting effect that may have on unintentional dissociation.

Accordingly, in some embodiments, the method of calibrating the mass spectrometer may further comprise measuring a vacuum pressure associated with the mass spectrometer. The vacuum pressure may be measured at various locations within the mass spectrometer. For example, in the mass spectrometer 10 of FIG. 1 a pressure of the vacuum of the mass spectrometer may be measured at the injection filter 40. In this region, gas passing through the injection filter 40 into the bent flatapole 50 provides for ion cooling within the bent flatapole 50. As such, the pressure of vacuum within the region of the injection filter 40 reflects the efficiency with which ions may be cooled in the ion optics devices of the mass spectrometer 10. Alternatively, the pressure of the vacuum may be measured elsewhere, for example the fore vacuum pressure of the mass spectrometer in the region of the S-lens 30 (a fore vacuum pressure of the mass spectrometer 10). The pressure measurement may be performed using any suitable pressure sensor (not shown in FIG. 1).

For example, for a calibration ion such as $[MRFA]^{2+}$, the mass spectrometer of FIG. 1 may measure the fore vacuum pressure while performing a calibration of the trapping potential. Table 1 below shows a relationship between a calibrated trapping potential (TP) that provides a target amount of unintentional dissociation of 3% and the fore vacuum pressure.

TABLE 1

| Fore vacuum [mbar] | m/z239:MRFA at TP 2.0 V [%] | m/z393:MRFA at TP 2.0 V [%] | Calibrated TP [V] |
|---|---|---|---|
| 1.63 | 3.94 | 4.26 | 1.474 |
| 1.68 | 3.35 | 3.65 | 1.737 |

Table 1 shows values for the amount of unintentional dissociation of two mass fragments ($[MRFA-MeSH]^{2+}$ (m/z 238.634 Th) and $[RFA+H2O]^{+}$ (m/z 393.224)) at a trapping potential of 2.0 V for different fore vacuum pressures. The characteristic voltage (the trapping potential of the ion routing multiple 120) is then calibrated according to method 200 above such that the amount of unintentional dissociation occurring is about 3%. The calibrated trapping potential for each fore vacuum pressure is shown in Table 1. Thus, it will be appreciated that as the fore vacuum pressure is reduced, the characteristic voltage may also be reduced in order to maintain a similar amount of unintentional dissociation of calibration ions.

By measuring the pressure when performing the calibration of the characteristic voltage, the characteristic voltage can subsequently be calibrated based on the measured vacuum pressure and the amount of unintentional dissociation of the calibration ions present in the MS1 spectrum. As such, the calibration method can take note of the pressure of the mass spectrometer/ion optics device when performing the calibration.

When the mass spectrometer is used to perform an MS1 analysis using sample ions, the mass spectrometer 10 may then perform a further pressure measurement using the same pressure sensor. The mass spectrometer 10 may then update the characteristic voltage that has been previously calibrated based on the measured pressure. As such, where the pressure of the mass spectrometer differs from the pressure at which the calibration was performed, the mass spectrometer may update the characteristic voltage to account for a change in ion cooling efficiency.

In some embodiments, the mass spectrometer may update the characteristic voltage based on a predetermined relationship between pressure, characteristic voltage, and the resulting amount of unintentional dissociation. The relationship may, for example, be a linear, or non-linear adjustment of the characteristic voltage in response to a variation in pressure. The desired linear or non-linear relationship may be provided by the controller 130 for the purposes of updating the characteristic voltage based on the measured pressure. In some embodiments, the relationship may be determined during the calibration process by performing a series of MS1 analyses at different characteristic voltages and operating pressures of the mass spectrometer.

Figure 5:
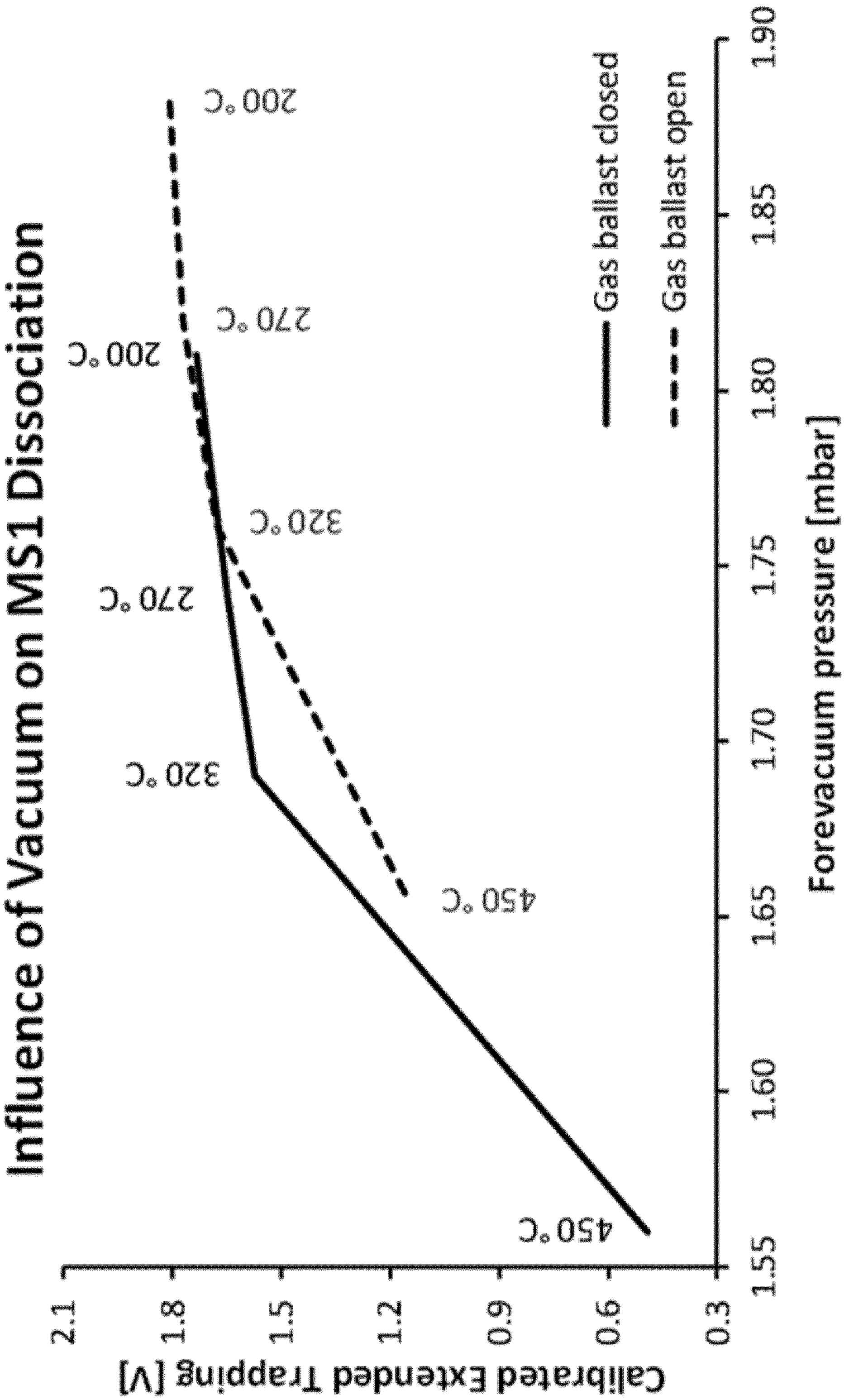
FIG. 5 is a graph showing the effect of varying a fore vacuum pressure and a transfer tube temperature of the mass spectrometer on the calibrated characteristic voltage.

For example, FIG. 5 shows a graph of a relationship between fore vacuum pressure for the mass spectrometer of FIG. 1 and the calibrated trapping potential that provides a target amount of unintentional dissociation of $[MRFA]^{2+}$ calibration ions of 3%. For the graph of FIG. 5, the fore vacuum pressure was varied intentionally through variation of the temperature of the Transfer Tube 25 and through closing or opening of the fore vacuum pump's gas ballast. Thus, it will be appreciated that the mass spectrometer 10 may be configured to perform a series of MS1 experiments in order to establish an empirical relationship between the vacuum pressure and the calibrated characteristic voltage. Such experiments may be performed as part of a method of calibrating the mass spectrometer 10.

Figure 6:
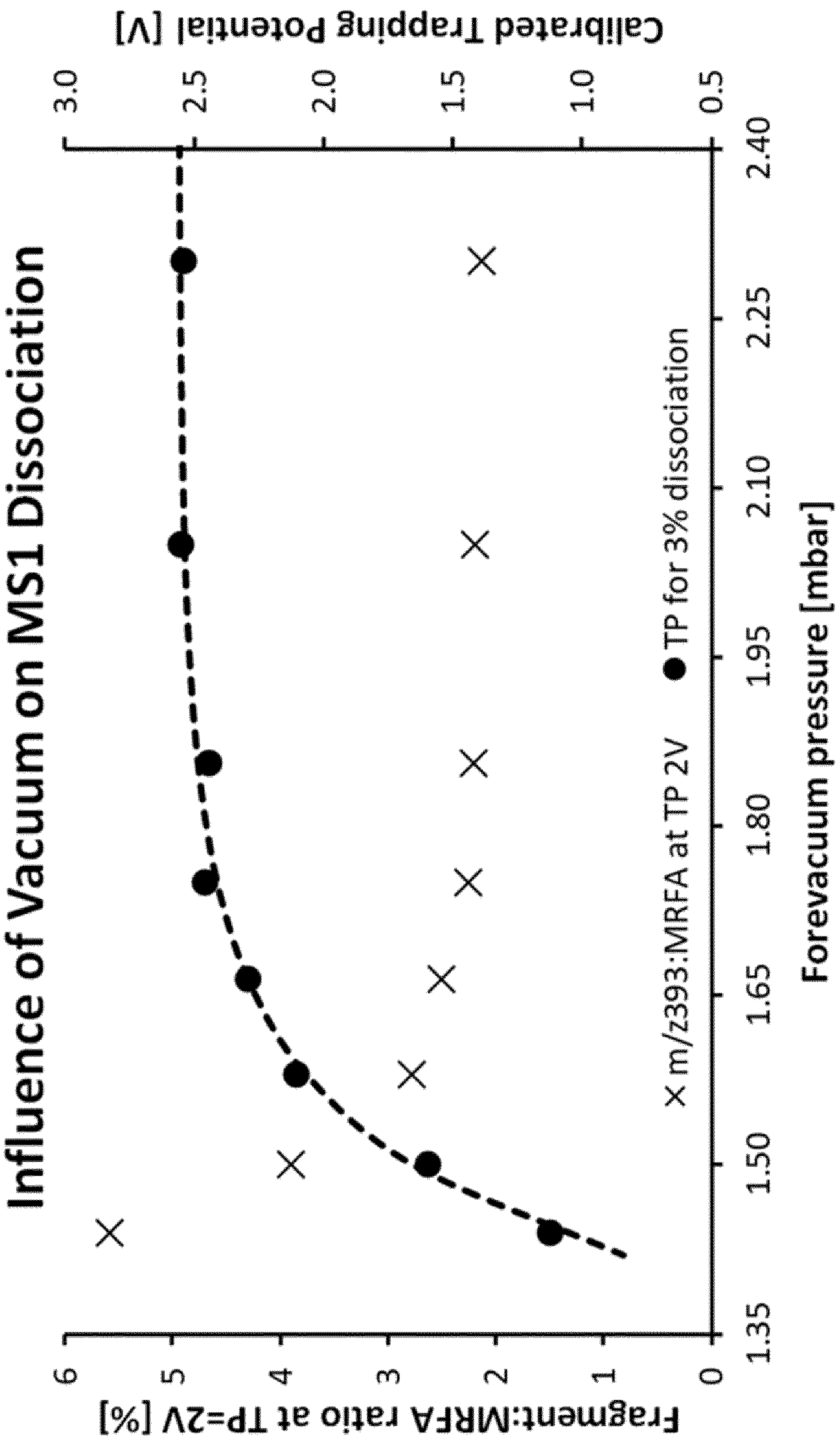
FIG. 6 is a graph showing the effect of independently varying a fore vacuum pressure of the mass spectrometer on the calibrated characteristic voltage.

FIG. 6 shows a further graph of the relationship between fore vacuum pressure for the mass spectrometer of FIG. 1 and the resulting calibrated trapping potential (trapping potential for 3% unintentional dissociation). FIG. 6 also shows a graph of the amount of unintentional dissociation of $[MRFA]^{2+}$ into $[RFA+H2O]^{+}$ (m/z 393) at a trapping potential of 2.0 V for different fore vacuum pressures. The measurements shown in FIG. 6 (and the associated calibrated trapping potentials) were obtained at a constant Transfer Tube 25 temperature of 320° C. Thus, it will be appreciated that the mass spectrometer 10 may be configured to perform a series of MS1 experiments in order to establish an empirical relationship between the vacuum pressure and the calibrated characteristic voltage. The measurements may be performed at a plurality of different Transfer tube 25 temperatures, for example as shown in FIGS. 5 and 6. Such experiments may be performed as part of a method of calibrating the mass spectrometer 10.

Figure 7:
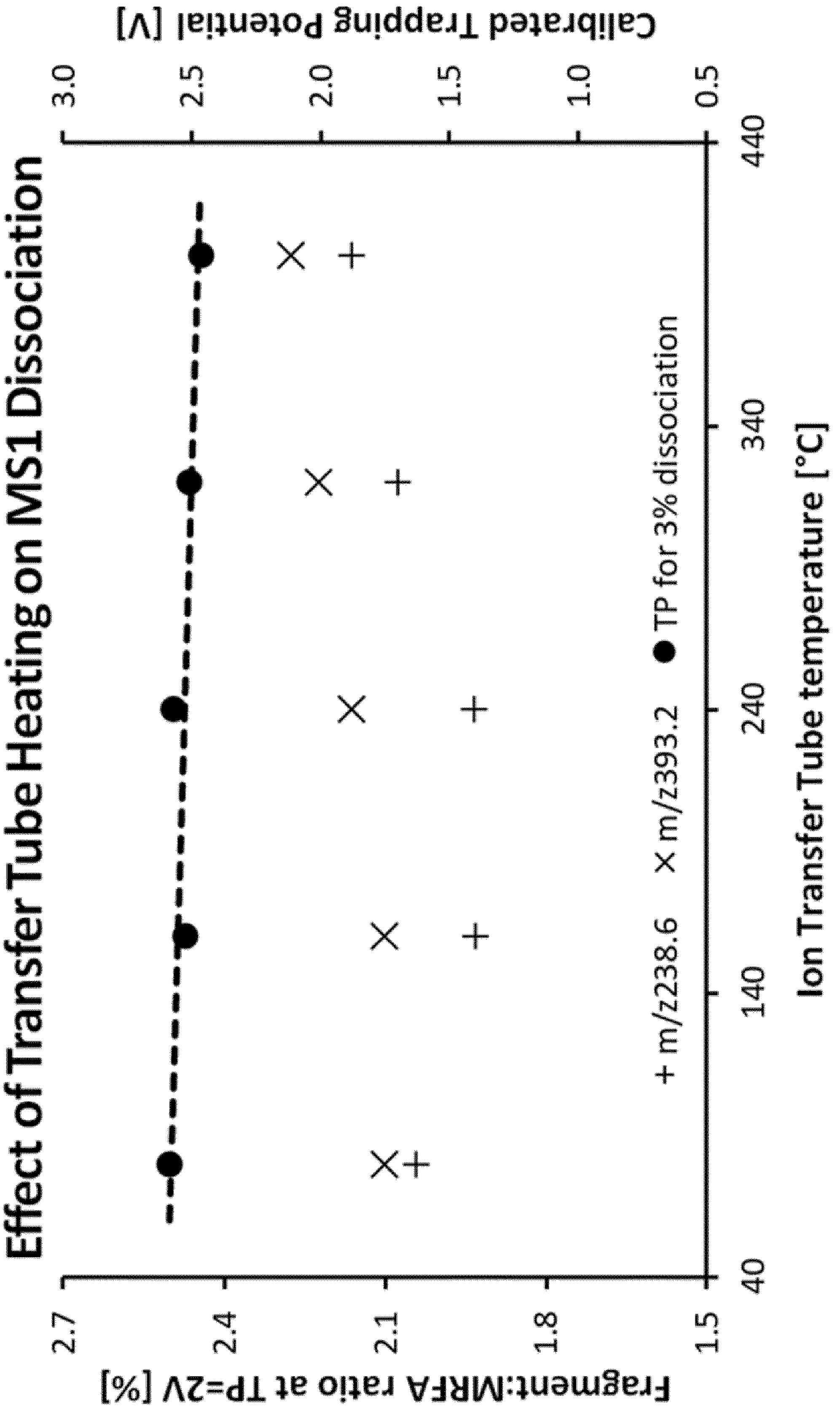
FIG. 7 is a graph showing the effect of independently varying a transfer tube temperature on the calibrated characteristic voltage.

FIG. 7 shows a further graph of the relationship between Transfer Tube 25 temperature and the resulting calibrated trapping potential (trapping potential for 3% unintentional dissociation). FIG. 7 also shows graphs of the amount of unintentional dissociation of $[MRFA]^{2+}$ into $[RFA+H2O]^{+}$ (m/z 393) and $[MRFA-MeSH]^{2+}$ (m/z 238.634 Th) at a trapping potential of 2.0 V for different Transfer Tube 25 temperatures. The measurements shown in FIG. 7 (and the associated calibrated trapping potentials) were obtained at a constant fore vacuum pressure of 1.94 mbar. Thus, it will be appreciated that the mass spectrometer 10 may be configured to perform a series of MS1 experiments in order to establish an empirical relationship between the transfer tube 25 temperature (or indeed the temperature of any ion optics device) and the calibrated characteristic voltage. It will be appreciated that the measurements may be performed at a plurality of different vacuum pressures. Such experiments may be performed as part of a method of calibrating the mass spectrometer 10.

During operation of the mass spectrometer 10 to perform a series of MS1 and/or MS2 analyses, the characteristic voltage may be updated repeatedly based on the pressure of the mass spectrometer. For example, the mass spectrometer 10 may update the characteristic voltage about every 15 minutes, or every time the measured pressure changes by more than a threshold amount (e.g. by 0.01 mbar). For example, the mass spectrometer 10 may update the characteristic voltage based on a relationship between the fore vacuum pressure and the characteristic voltage which is obtained as part of a method of calibrating the mass spectrometer 10 (e.g. based on the relationships shown in FIGS. 5, 6 and 7).

In accordance with the embodiments described above, the characteristic voltage to be updated may be, for example, a trapping potential of the ion routing multipole 120. In another embodiment, the characteristic voltage to be updated may be an RF potential applied to, for example, the S-lens 30. The pressure of the mass spectrometer 10 in the region of the S-lens 30 may also affect the properties of ion transport through S-lens 30. As such, the characteristic voltage of S-lens 30 may also be calibrated based on an amount of unintentional dissociation and a pressure of the mass spectrometer 10 in accordance with the methods described above. Furthermore, the RF voltage applied to the S-lens 30 may be controlled to improve ion transport properties as further described in GB-A-2569639.

While the above method includes updating the characteristic voltage based on a pressure of the mass spectrometer 10, it will be appreciated that the mass spectrometer may also update the characteristic voltage based on other parameters of the mass spectrometer 10 which may affect the amount of unintentional dissociation occurring in the mass spectrometer 10. As such, the characteristic voltage may be controlled via feedback from one or more sensors of the mass spectrometer 10 in order to reduce or eliminate variation in the amount of unintentional dissociation occurring during operation of the mass spectrometer 10. For example, the temperature of one or more of the ion optics devices may also affect the amount of unintentional dissociation occurring during e.g. an MS1 analysis. For example, as shown in FIG. 7, a relationship between the temperature of the Transfer tube 25 and the calibrated trapping potential may be established. Accordingly, the characteristic voltage may be controlled based on the temperature of the transfer tube 25.

Accordingly, a mass spectrometer 10 is provided that may be calibrated to provide an amount of unintentional dissociation of ions. That is to say, when performing e.g. MS1 analyses the amount of unintentional dissociation of sample ions may be controlled such that MS1 analyses performed at different times, or on different mass spectrometers, may be comparable in terms of unintentional dissociation of sample ions. Control of the unintentional dissociation of sample ions is particularly relevant where the sample ions to be analysed are relatively fragile ions, such as ions of amino acids (e.g. isoleucine, phenylalanine), ions of (oligo)peptides (e.g. MRFA, ALELFR, Substance P (RPKPQQFFGLM)), and ions of lipids.

Although embodiments of the disclosure have been described herein in detail, it will be understood by those skilled in the art that variations may be made thereto without departing from the scope of the invention or of the appended claims.

The invention claimed is:

1. A method of calibrating a mass spectrometer comprising:

generating calibration ions from an ion source;

transporting the calibration ions from the ion source to a mass analyser of the mass spectrometer via an ion optics device, wherein a characteristic voltage applied to the ion optics device controls transit of ions into the ion optics device and/or out of the ion optics device, the characteristic voltage applied also resulting in an amount of unintentional dissociation of the calibration ions;

performing an MS1 analysis of the calibration ions using the mass analyser to obtain an MS1 spectrum of the calibration ions; and determining the amount of unintentional dissociation of the calibration ions present in the MS1 spectrum, wherein the characteristic voltage of the ion optics device is calibrated based on the amount of unintentional dissociation of the calibration ions present in the MS1 spectrum to provide a target amount of unintentional dissociation of calibration ions during an MS1 analysis.

2. A method according to claim 1, wherein the amount of unintentional dissociation is determined based on an intensity of a mass spectral peak associated with a fragment ion of the calibration ions relative to an intensity of a mass spectral peak associated with the calibration ions.

3. A method according to claim 2, wherein the target amount of unintentional dissociation is no greater than 15%, 10%, 7%, 5%, 3%, 2%, 1%, or 0.5%.

4. A method according to claim 2, wherein the target amount of unintentional dissociation is in a range of 1% to 10%, or 2% to 8%, or 3% to 6%.

5. A method according to claim 1, wherein a plurality of MS1 analyses are performed at different characteristic voltages, wherein the amount of unintentional dissociation of the calibration ions is determined for each MS1 spectra; and the characteristic voltage is calibrated based on the amount of unintentional dissociation of the calibration ions present in the MS1 spectra to provide a target amount of unintentional dissociation of calibration ions during an MS1 analysis.

6. A method according to claim 1, wherein the characteristic voltage is at least one DC voltage applied to the ion optics device to provide a DC offset to the ion optics device; or the characteristic voltage is at least one RF voltage applied to the ion optics device configured to confine ions in the ion optics device.

7. A method according to claim 1, wherein the ion optics device is an ion trap.

8. A method according to claim 7, wherein transporting the calibration ions from the ion source to the mass analyser via the ion optics device comprises storing the calibration ions in the ion trap.

9. A method according to claim 7, wherein the characteristic voltage is used to calibrate a plurality of voltages applied to the ion trap, the plurality of voltages configured to control one or more of: injecting calibration ions into the ion trap, confining calibration ions in the ion trap, and ejecting calibration ions from the ion trap.

10. A method according to claim 1, further comprising measuring a vacuum pressure associated with the mass spectrometer, wherein the characteristic voltage of the ion optics device is calibrated based on the amount of unintentional dissociation of the calibration ions present in the MS1 spectrum and the measured vacuum pressure.

11. A method according to claim 1, wherein the ion optics device comprises a multipole assembly, preferably a quadrupole assembly.

12. A method according to claim 1, wherein transporting the calibration ions from the ion source to a mass analyser of the mass spectrometer via an ion optics device comprises:

transporting the calibration ions from the ion source to a mass selector, wherein the mass selector mass filters the calibration ions;

transporting the calibration ions to the ion optics device; and transporting the calibration ions from the ion optics device to the mass analyser.

13. A method according to claim 1, wherein the mass analyser comprises:

an orbital trapping mass analyser, a time-of-flight mass analyser, a Fourier transform mass analyser, an ion trap mass analyser, a quadrupole mass analyser, or a magnetic sector mass analyser.

14. A method according to claim 1, wherein a plurality of mass spectrometers are calibrated to provide a target amount of unintentional dissociation of calibration ions during an MS1 analysis.

15. A method of mass spectrometry for a mass spectrometer comprising:

generating sample ions from an ion source;

transporting the sample ions from the ion source to a mass analyser of the mass spectrometer via an ion optics device, wherein a characteristic voltage applied to the ion optics device controls the transit of ions into the ion optics device and/or out of the ion optics device; and performing an MS1 analysis of the sample ions using the mass analyser to obtain an MS1 spectrum of the sample ions;

wherein the characteristic voltage of the ion optics device is calibrated according to the method of claim 1 to provide an amount of unintentionally dissociated sample ions during the MS1 analysis.

16. A method according to claim 15, further comprising determining the amount of unintentional dissociation based on an intensity of one or more mass spectral peaks associated with a fragment ion of the sample ions relative to an intensity of one or more mass spectral peaks associated with the sample ions.

17. A method according to claim 16, wherein the amount of unintentional dissociation is no greater than 15%, 10%, 7%, 5%, 3%, 2%, 1%, or 0.5% of the sample ions transported to the mass analyser via the ion optics device.

18. A method according to claim 15, wherein the amount of unintentional dissociation is in a range of 1% to 10%, or 2% to 8%, or 3% to 6% of the sample ions transported to the mass analyser via the ion optics device.

19. A method according to claim 15, further comprising:
measuring a vacuum pressure associated with the mass spectrometer; and
updating the characteristic voltage of the ion optics device based on the vacuum pressure of the mass spectrometer.

20. A mass spectrometer comprising:
an ion source configured to generate calibration ions;
an ion optics device configured to receive calibration ions from the ion source; a mass analyser configured to receive calibration ions from the ion optics device; and
a controller, wherein the controller is configured to calibrate the mass spectrometer by:
causing the ion source to generate calibration ions;
causing the mass spectrometer to transport the calibration ions from the ion source to the mass analyser of the mass spectrometer via the ion optics device, wherein a characteristic voltage is applied to the ion optics device to control transit of ions into the ion optics device and/or out of the ion optics device, wherein the characteristic voltage applied results in an amount of unintentional dissociation of the calibration ions;
causing the mass analyser to perform an MS1 analysis of the calibration ions to obtain an MS1 spectrum of the calibration ions;
determining the amount of unintentional dissociation of the calibration ions present in the MS1 spectrum; and
calibrating the characteristic voltage of the ion optics device based on the amount of unintentional dissociation of the calibration ions present in the MS1 spectrum to provide a target amount of unintentional dissociation of calibration ions during an MS1 analysis.

* * * * *